(12) United States Patent
Wahl

(10) Patent No.: US 7,475,793 B2
(45) Date of Patent: Jan. 13, 2009

(54) BULK BAG UNLOADER WITH FLOW REGULATION

(76) Inventor: Richard C. Wahl, 66 Holton La., Essex Fells, NJ (US) 07021

( * ) Notice: Subject to any disclaimer, the term of this patent is extended or adjusted under 35 U.S.C. 154(b) by 369 days.

(21) Appl. No.: 11/258,485

(22) Filed: Oct. 25, 2005

(65) Prior Publication Data
US 2006/0151525 A1   Jul. 13, 2006

Related U.S. Application Data

(60) Provisional application No. 60/642,043, filed on Jan. 7, 2005.

(51) Int. Cl.
*G01G 13/00* (2006.01)
(52) U.S. Cl. ............... 222/77; 222/55; 222/58; 222/161; 222/181.2; 222/196; 222/198
(58) Field of Classification Search .......... 222/52, 222/57–58, 77, 181.1, 181.2, 185.1, 196–198, 222/200, 161
See application file for complete search history.

(56) References Cited

U.S. PATENT DOCUMENTS

| 4,247,019 | A | * | 1/1981 | Lerner | 222/56 |
| 5,306,876 | A | * | 4/1994 | Volk et al. | 177/70 |
| 5,379,923 | A | * | 1/1995 | Sagastegui et al. | 222/181.2 |
| 5,649,801 | A | * | 7/1997 | White | 414/412 |
| 5,937,996 | A | | 8/1999 | Friedman et al. | |
| 6,227,408 | B1 | * | 5/2001 | Poulton | 222/1 |
| 6,832,905 | B2 | * | 12/2004 | Delzer et al. | 425/80.1 |
| 6,923,340 | B2 | * | 8/2005 | Ambs | 222/105 |
| 7,017,624 | B2 | * | 3/2006 | Reinsch et al. | 141/83 |
| 7,293,585 | B2 | * | 11/2007 | Mahoney | 141/114 |

\* cited by examiner

*Primary Examiner*—Frederick C. Nicolas
(74) *Attorney, Agent, or Firm*—Gerald E. Hespos; Anthony J. Casella

(57) ABSTRACT

A bulk bag unloader includes a frame, a bag support, a hopper beneath the bag support and an outlet chute beneath the hopper. The hopper and the outlet chute are mounted to the frame for movement substantially in unison relative to the frame. Two vibrators are mounted respectively on opposite sides of the hopper and synchronized to generate vibratory movement substantially along the axis of the outlet chute. Thus, the vibrators function to achieve an efficient and continuous discharge from the bulk bag and employ the outlet chute to regulate or stop the flow in accordance with system requirements.

5 Claims, 4 Drawing Sheets

BULK BAG UNLOADER WITH FLOW REGULATION

This application claims priority on U.S. Provisional Patent Appl. No. 60/642,043, filed Jan. 7, 2005.

BACKGROUND OF THE INVENTION

1. Field of the Invention

The invention relates to an apparatus for achieving a controlled rate of discharge of a flowable particulate material from a bulk storage bag.

2. Description of the Related Art

Many manufacturing processes, such as processes performed in the chemical, pharmaceutical and food industries, utilize particulate materials. The particulates may take the form of pellets, flakes, powders or fibers. The particulates often are purchased from an outside vendor or supplier and are transported to a site where the particulates will be processed. In other situations, the particulates will be subjected to an initial processing at one manufacturing location of a company and then shipped to another facility of the same company for further processing.

Particulates traditionally were transported in rigid shipping containers, such as heavy metal tote bins or in Gaylord box containers. The heavy metal tote bins are emptied and then returned to the source of the particulate materials for reuse. The tote bins are heavy even in their emptied condition and occupy the same volume in their emptied condition. Hence, the return of the empty tote bin to the source of the particulates imposes a significant cost penalty and inconvenience. Gaylord box containers are disposable. However, waste disposal also creates inconveniences and imposes actual and environmental costs. Gaylord box containers are not constructed to function as in-plant use bins from which particulates may be dispensed. Thus, the contents of a Gaylord box must be transferred to another bin, thereby creating more handling and additional cost.

Bulk bags have been used in recent years for shipping, storing and dispensing particulate materials. Bulk bags are formed from a strong flexible material and offer several advantages. For example, bulk bags can be collapsed prior to filling, and hence do not occupy extensive space at the source of the particulate material. Similarly, bulk bags can be collapsed after emptying. Bulk bags that are intended for reuse can be shipped back to the source of the particulate material in a collapsed condition, thereby achieving space efficiencies. The characteristics of some particulate materials preclude reuse of the bulk bag. However, these one-way bulk bags still offer efficiencies in that the empty bulk bag can be collapsed easily into a size and shape for convenient disposal or recycling.

The typical bulk bag has a generally rectangular footprint to achieve optimum space utilization for storage and transportation. Bulk bags are available in several different sizes. One common bulk bag is approximately six feet tall when filled and approximately four feet square. The top of a typical bulk bag includes a plurality of looped straps so that the bulk bag can be lifted and suspended by the straps. The bottom of a bulk bag that is intended for reuse typically includes a spout that can be opened to discharge the particulate material from the bulk bag.

Bulk bags often are moved from one location to another in a manufacturing facility with a fork lift. The blades of a fork lift truck can be inserted through the looped handles of the bulk bag. The bag then is lifted and moved to a bag unloader. Other manufacturing facilities may utilize systems of hoists and trolleys to transport bulk bags.

The typical bulk bag unloader includes a frame and a device for suspending the bulk bag. The bottom end of the suspended bulk bag can be open so that the particulate material therein can be red from the bulk bag for use in a manufacturing process.

Particulates present unique product delivery problems that have been considered in industry for many years. More specifically, particulates may interfere with one another and prevent a pure gravitational flow comparable to the gravitational flow of liquids. The prior art includes particulate feeders that rely upon vibration to achieve a continuous flow of the particulates. The vibration causes the particles to move relative to one another. This movement prevents or minimizes interference between adjacent particles, and thereby permits a continuous flow of the particulates.

Bulk bag unloaders have addressed the product delivery problems of particulates in several different ways. For example, some manufacturers of bulk bag unloaders provide one or more paddles adjacent the suspended bulk bag. The paddles repeatedly strike the side of the bulk bag to generate sufficient movement so that the particulates can be dispensed continuously from the bulk bag. Vibra Screw, Inc. manufacturers a bulk bag unloader with an upwardly open support cone or hopper suspended from the unloader frame at a location beneath the bulk bag. A gyrator is mounted to the hopper and causes the suspended hopper to vibrate relative to the support frame. The vibration transmitted to the hopper acts on the bag spout to achieve a continuous flow of particulate material from the suspended bag.

Most manufacturing processes require the particulate materials to be delivered in controlled amounts or at controlled rates. However, the prior art bag unloaders are not at all well suited for controlling the rate of discharge of particulate materials from the bag. Bag unloaders can be used with load cells to measure the amount of particulate material that has been discharged from the bulk bag. For example, the load cells may be mounted beneath the legs of the frame from which the bulk bag is suspended. The paddles or the gyrator can be turned off when the load cells determine that a sufficient volume of the particulate materials has been discharged from the bulk bag. However, the particulate material will continue to flow gravitationally from the outlet spout of the bulk bag for a considerable time after the paddles or gyrator have been stopped. As a result, some other control means has been incorporated into the bag unloader.

Some bag unloaders have been adapted or retrofitted to include a gate valve or butterfly valve that can positively open and close the outlet from the bag unloader. Other bag unloaders have been adapted or retrofitted to include a structurally or functionally independent volumetric or gravimetric feeder. For example, a screw feeder can be disposed in proximity to the outlet from the bag unloader. Particulates are fed into the screw feeder and then are transported substantially horizontally away from the bag unloader and to a position where the particulate materials are dispensed from the screw feeder. Other bag unloaders have been used in conjunction with conveyors or vibratory feeders. A vibratory feeder generally defines an elongate tube or channel that is operative to vibrate along the axis of the tube or channel. This vibration causes the particulate materials in the tube or channel to incrementally shift along the length of the tube or channel.

Screw feeders, vibratory feeders or conveyors all permit relatively accurate feed rates. Additionally, the feeding of the particulates can be stopped merely by stopping the screw feeder, vibratory feeder or conveyor. However, the need for a structurally and functional independent feed apparatus to be used with the bulk bag unloader adds considerably to the size and cost of the unloader. For example, a volumetric feeder is likely to add 30%-40% to the price of the bulk bag unloader and is likely to increase the height of the bulk bag unloader by 3 ft.-5 ft. A valve is smaller and less expensive than a volumetric feeder. However, valves that are suitable for particulate material generally can function only in on/off modes, and do not permit flow regulation.

Accordingly, an object of the invention is to provide a bulk bag unloader that can achieve a variable flow rate without extensively increasing the cost or size of the unloader.

SUMMARY OF THE INVENTION

The invention relates to a bulk bag unloader with a frame and means for suspending a bulk bag. An upwardly concave hopper is moveably mounted to the frame at a position below the suspended bulk bag. An outlet extends angularly from the lower end of the hopper. The outlet may be a tube, channel or trough and preferably is aligned at an angle of between 90° and about 45° to a gravitational axis extending symmetrically through the bulk bag. The particular angle is selected based on the characteristics of the particulates being dispensed and the required accuracy of the flow regulation. Flow regulation is enhanced as the axis of the outlet approaches a 90° angle to the gravitational axis. Thus, maximum flow control is achieved when the axis of the outlet is at or near a horizontal alignment.

The bulk bag unloader further includes two vibrator motors on opposite sides of the hopper. The vibrator motors lie in a plane that passes through the gravitational axis of symmetry of the bulk bag and in a plane that is perpendicular to the plane that contains both the gravitational axis of the bulk bag and the axis of the outlet. Thus, if the outlet is considered to lie in a plane that extends in a front-to-rear direction on the unloader, then the vibrators lie in a plane that extends in a side-to-side direction on the unloader. The vibrators function to substantially cancel forces directed towards or away from the bulk bag. Thus, both vibrators will create inward forces towards the bulk bag at approximately the same time and will create outward forces away from the bulk bag at the same time. However, the vibrators cooperate with one another for movement in parallel planes on opposite sides of the bulk bag and substantially parallel to the axis of the outlet. Thus, the vibrators perform two key functions. First, the vibrators impart vibration to the outlet from the bag so that a continuous flow of particulates is achieved into and from the hopper. Second, the vibrators generate longitudinal movement in the outlet substantially along the axis of the outlet. Thus, particulate material is assured of flowing from the bulk bag and is transported transversely from the unloader. Additionally, the flow of particulates from the unloader can be stopped or regulated with considerable accuracy, and with much greater accuracy than available with prior art unloaders that rely only on a single vibrator mounted to the hopper or that rely upon paddles to strike the sides of the bag. In this regard, the rate of flow of the particulates from the outlet can be controlled by varying the vibration force, the vibration frequency (speed) or amplitude of the vibrations imparted to the outlet by the vibrators. A common device to accomplish this is a variable frequency controller. Similarly, the flow from the outlet can be terminated merely by terminating the vibration.

The bulk bag unloader can be used with load cells mounted to or incorporated into the frame of the unloader. The load cells can communicate with a computer or other controller that is operatively connected to the vibrators. The controller can terminate the operation of the vibrators in response to a sensed discharge from the bulk bag as measured by the load cells.

The incorporation of the second vibrator into the unloader is much less expensive than the incorporation of a structurally and functionally separate gravimetric or volumetric feeder into the unloader. The separate vibrator adds only minimally to the footprint of the unloader and does not add at all to the height of the unloader. The incorporation of the outlet will add only slightly to the height of the unloader, and much less than the height addition required by the above-described gravimetric or volumetric feeder. Additionally, the combination of the outlet with the synchronized vibrators provides for a flow regulation that cannot be achieved with a simple valve at the outlet.

DETAILED DESCRIPTION OF THE PREFERRED EMBODIMENT

Figure 1:
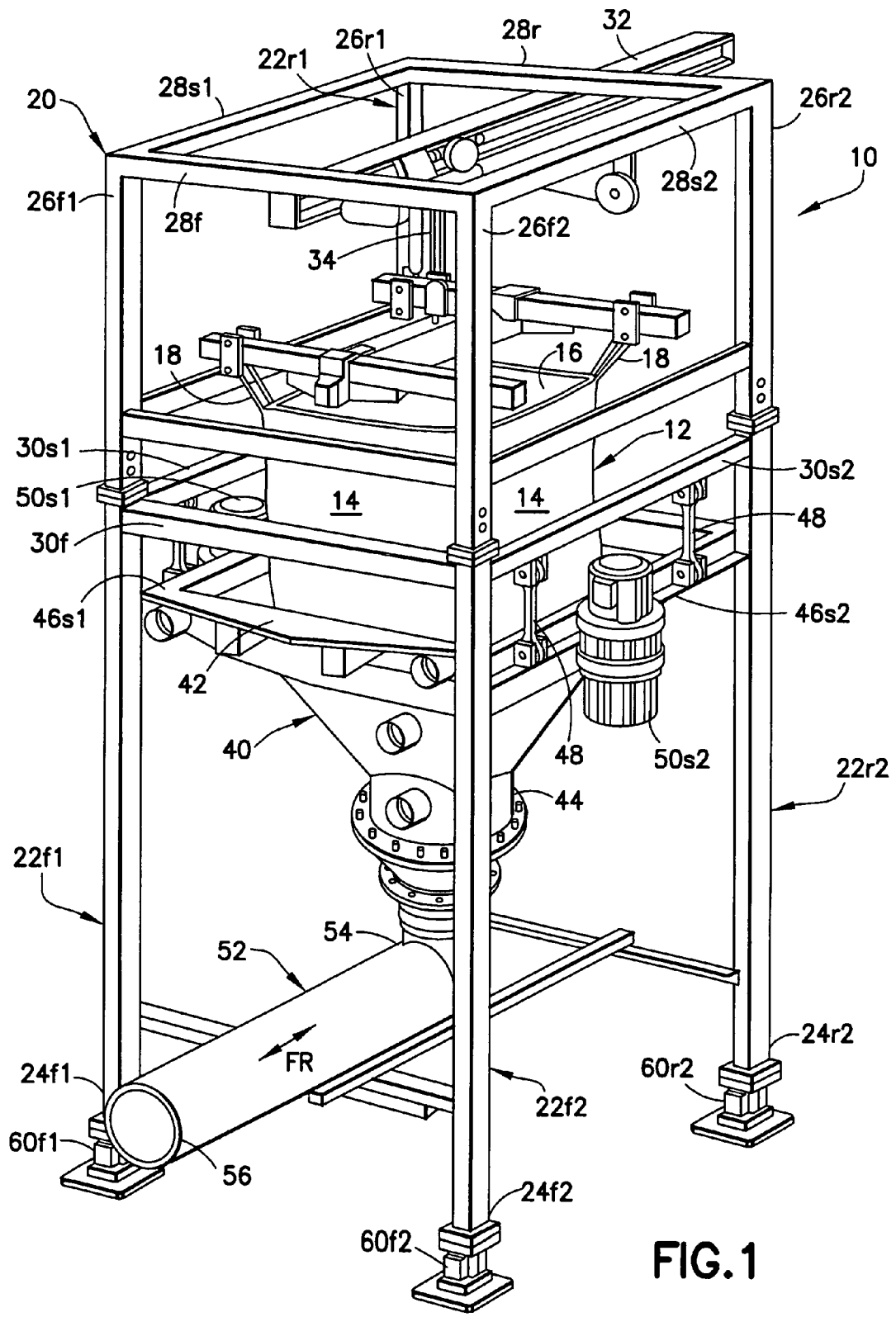
FIG. 1 is a perspective view of a bag unloader in accordance with the invention.
Figure 2:
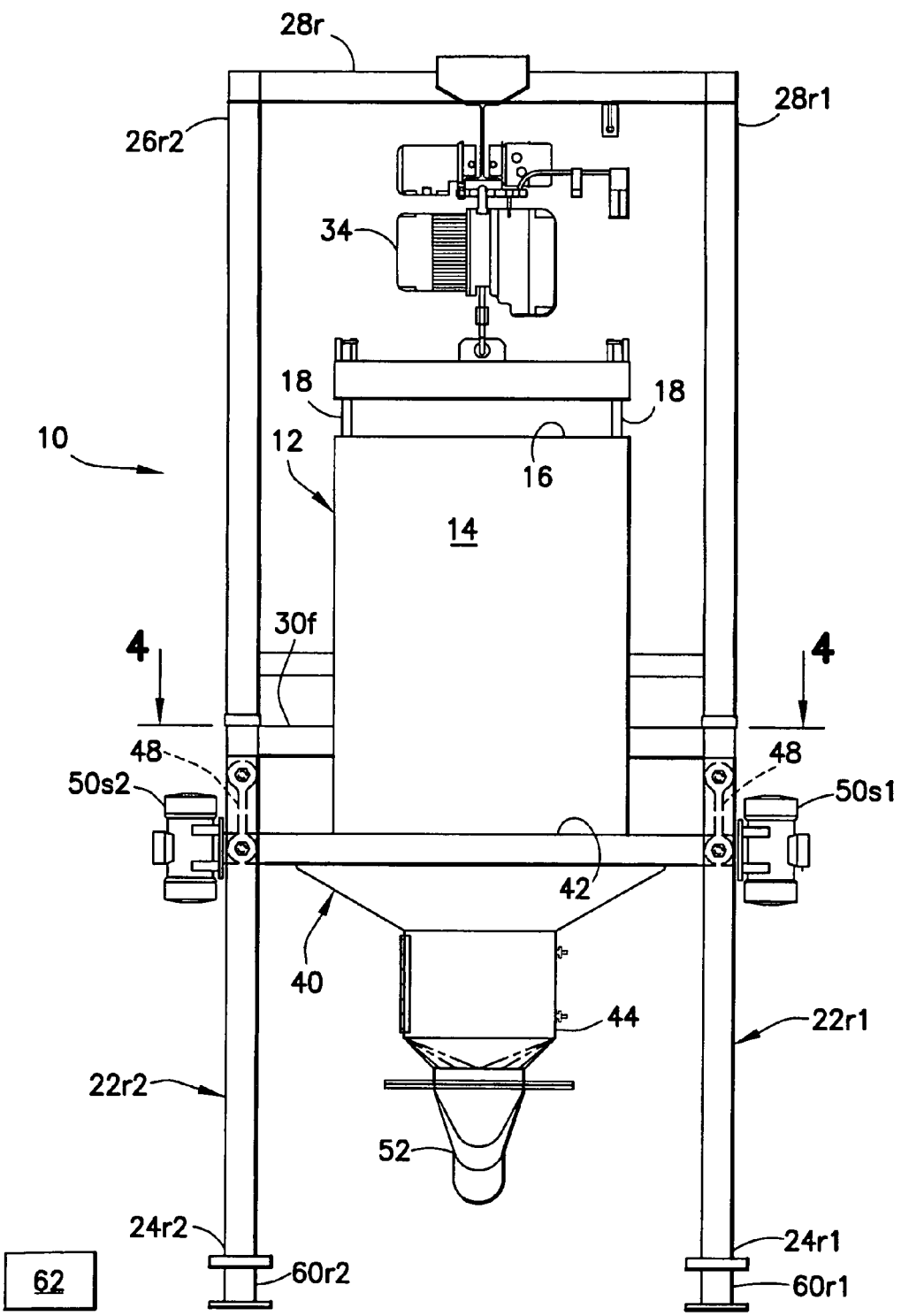
FIG. 2 is a rear elevational view of the bag unloader shown in FIG. 1.

A bag unloader in accordance with the invention is identified generally by the numeral 10 in FIGS. 1-4. The bulk bag unloader 10 is intended for use with a bulk bag 12 formed from a strong flexible collapsible material. The bulk bag 12 is substantially rectangular when filled, as shown in FIG. 1. Thus, the bulk bag 12 has four substantially rectangular side walls 14, a top wall 16 and a bottom (not shown). The bottom is formed with a spout that can be opened to access the contents of the bulk bag 12. Four looped straps 18 extend from the top corners of the bulk bag 12 and permit the bulk bag 12 to be lifted by a fork lift truck and transported to the unloader 10. The bulk bag 12 illustrated herein is of prior art construction. Other configurations of bags exist and can be employed with the unloader 10.

The unloader 10 includes a generally rectangular frame 20 with four vertical support posts. More particularly, the frame 20 includes first and second front support posts $22f1$ and $22f2$ and first and second vertical rear support posts $22r1$ and $22r2$. The vertical supports $22f1$, $22f2$, $22r1$ and $22r2$ have bottom ends $24f1$, $24f2$, $24r1$ and $24r2$ respectively. Similarly, the vertical supports $22f1$, $22f2$, $22r1$ and $22r2$ have top ends $26f1$, $26f2$, $26r1$ and $26r2$. A front top beam $28f$ extends horizontally between the top ends $26f1$ and $26f2$ of the front vertical supports $22f1$ and $22f2$. A rear top beam $28r$ extends horizontally between the top ends $26r1$ and $26r2$ of the vertical rear supports $22r1$ and $22r2$. Hence, the front and rear top beams $28f$ and $28r$ are substantially parallel to one another. A first side top beam $28s1$ extends between the top ends $26f1$ and $26r1$ of the first front vertical support $22f1$ and the first rear vertical support $22r1$. Similarly, a second side top beam $28s2$ extends between the top ends $26f2$ and $26r2$ of the second front vertical support $22f2$ and the second rear vertical support $22r2$.

A front intermediate beam $30f$ extends between intermediate positions on the first and second front vertical supports $22f1$ and $22f2$. A first side intermediate beam $30s1$ extends between intermediate positions on the first front vertical support $22f1$ and the first rear vertical support $22r1$. Similarly, a second side intermediate beam extends between intermediate positions on the second front vertical support $22f2$ and the second rear vertical support $22r2$. The first side intermediate beam $30s1$ and the second side intermediate beam $30s2$ are substantially parallel to one another and substantially perpendicular to the front intermediate beam $30f$. There is no rear intermediate beam.

A hoist support beam 32 extend from the front top beam $28f$ to and beyond the rear top beam $28r$. A hoist apparatus 34 is mounted movably to the hoist support beam 32. The hoist apparatus 34 is of prior art construction and functions to lift, move and suspend the bulk bag 20 at a position substantially centrally within the frame 20. Hoists other than the hoist 34 illustrated herein are known in the prior art and can be used with the unloader 10. For example, the unloader 10 can rely entirely upon fork lift trucks to position the bulk bag on the top beams 28f, 28r, 28s1 and 28s2.

A hopper 40 is supported moveably at an intermediate position in the frame 20. More particularly, the hopper 40 is a hollow frustum-shaped structure oriented with a large open end 42 disposed above a small open end 44. In the illustrated embodiment, the hopper 40 has four trapezoidal side walls joined to one another at corners. However, the side walls of the hopper 40 can be stepped to define a region with a steeper slope closer to the open bottom end 44. Additionally, the hopper 40 can have a generally conical shape or some other tapered configuration from a large top to a smaller bottom.

First and second side flanges 46s1 and 46s2 are provided at the open top end 42 of the hopper 40 generally parallel to the first and second sides of the frame 20. Two links extend pivotally between the first side flange 46s1 and the first intermediate side beam 30s1. Similarly, two links 48 extend pivotally between the second side flange 46s2 and the second side intermediate beam 30s2. The links 48 permit the hopper 40 to move within a horizontal plane in an area bounded by the frame 20.

First and second side vibrators 50s1 and 50s2 are mounted to the first and second side flanges 46s1 and 46s2 between the respective links 48. The vibrators 50s1 and 50s2 generate vibrations by rotating eccentric loads about a vertical axis. Significantly, the vibrators 50s1 and 50s2 are synchronized with one another. More particularly, the vibrators 50s1 and 50s2 are synchronized to substantially cancel their respective vibrations in a side-to-side direction identified by the arrow S in FIG. 1. However, the vibrators 50s1 and 50s2 are synchronized to cooperate with one another in generating vibrations in a front-to-rear direction as indicated by the arrow FR in FIG. 1. With this arrangement, the hopper 40 is subject to only minimal movement in the side-to-side direction S, but undergoes reciprocal front-to-rear movement. These movements of the hopper 40 generated by the vibrators 50s1 and 50s2 are sufficient to achieve an efficient discharge of particulates from the bag 12.

Figure 3:
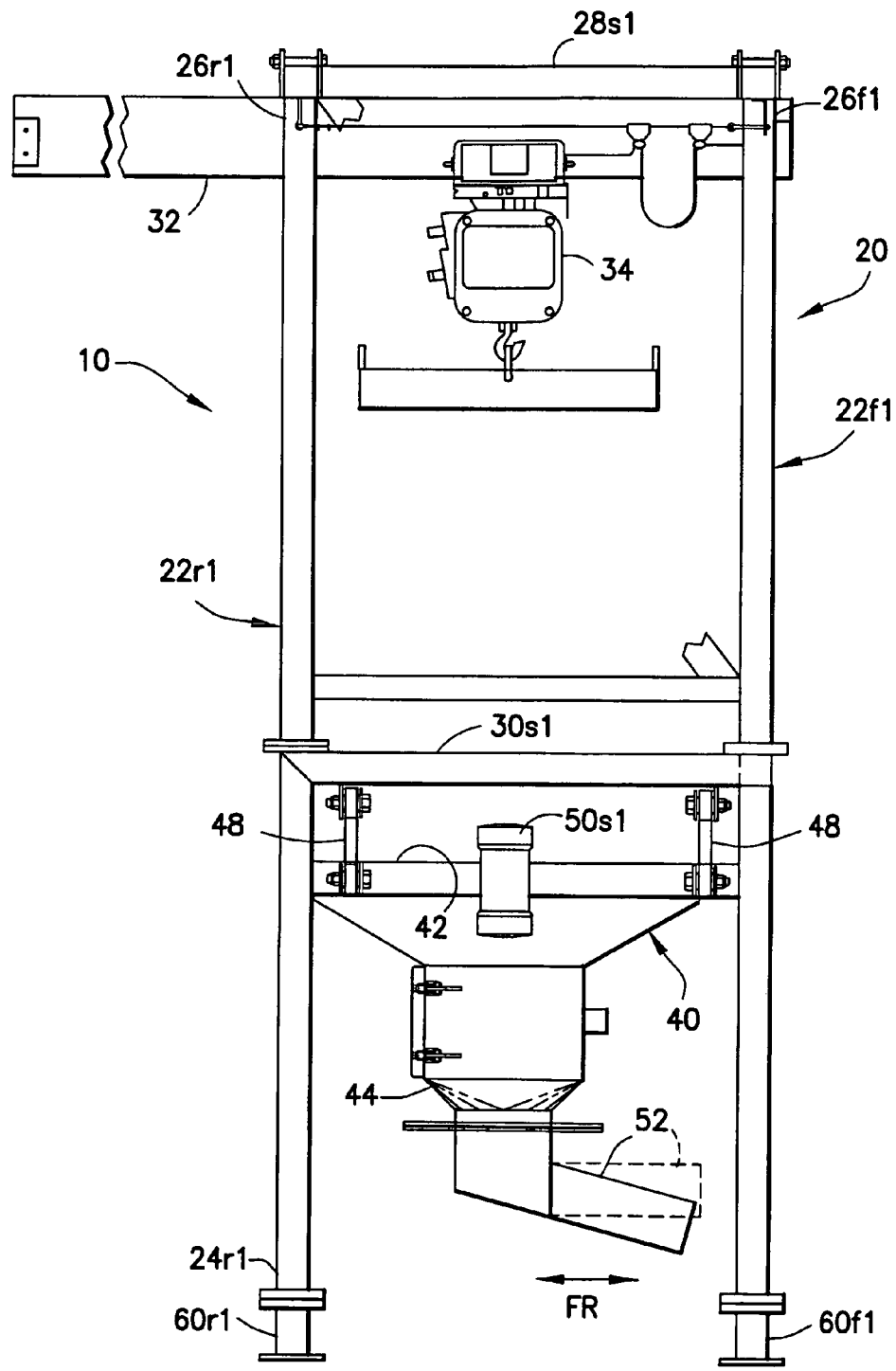
FIG. 3 is a side elevational view of the bag unloader.
Figure 4:
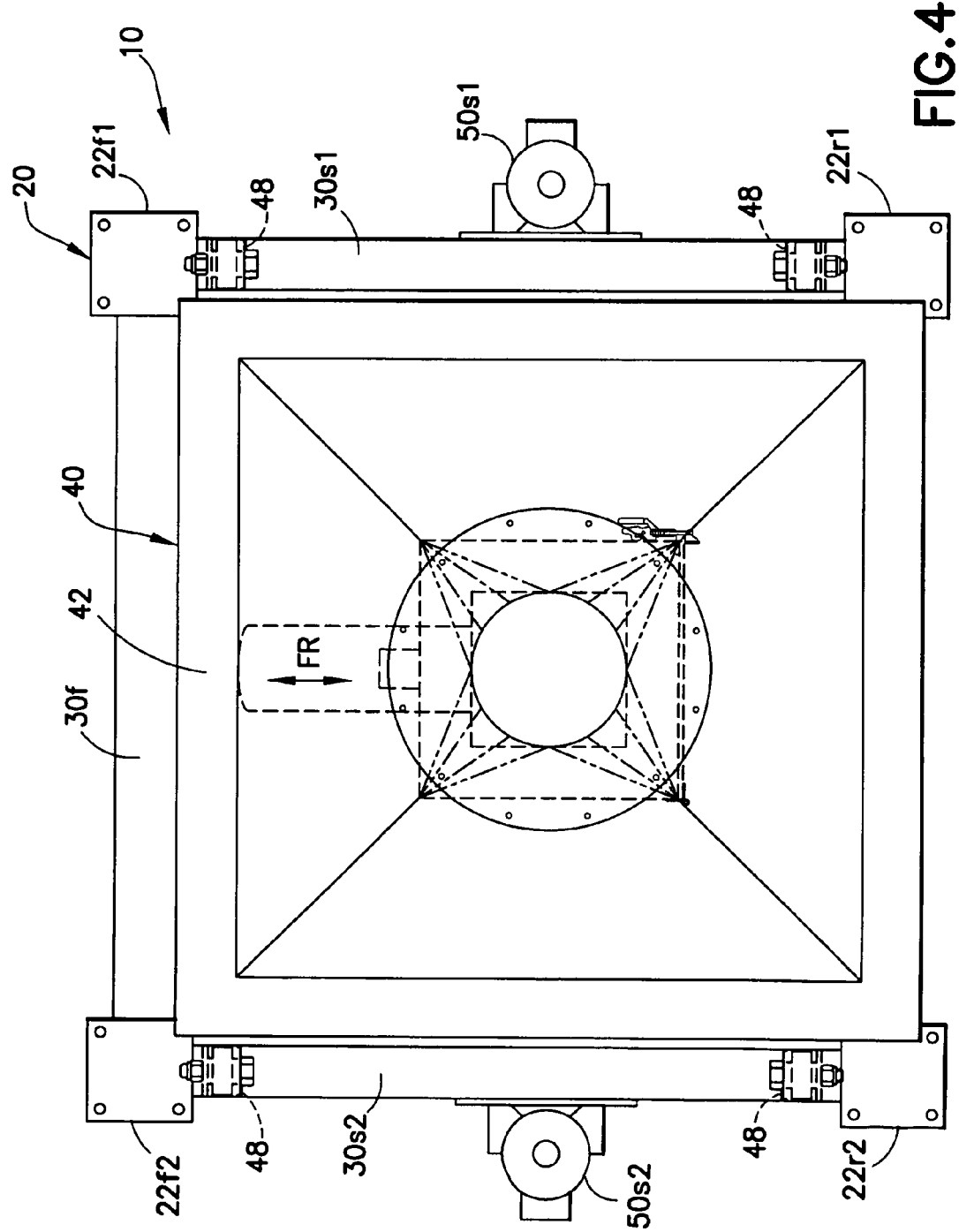
FIG. 4 is a cross-sectional view taken along line 4-4 in FIG. 2.

The apparatus 10 further includes a discharge chute 52 below the hopper 40. The discharge chute 52 has an inlet end 54 that communicates with the outlet 44 of the hopper 40. The discharge chute 52 further includes an outlet end 56 that projects forward towards or beyond the plane defined by the vertical front supports 22f1 and 22f2. The discharge chute 52 preferably is substantially horizontal as illustrated in FIG. 1. However, the discharge chute 52 can be aligned down at an acute angle, as shown in FIG. 3, so that the front outlet end 56 is slightly lower than the rear inlet end 54. The outlet chute 52 extends substantially parallel to the front-to-rear direction of vibratory movement created by the vibrators 50s1 and 50s2. With this construction and this orientation, the vibrators 50s1 and 50s2 will cause a front-to-rear vibration of the outlet chute 52 along arrow FR with minimum side-to-side vibration thereof along arrow S. This front-to-rear reciprocal movement of the outlet chute 52 caused by the vibrators 50s1 and 50s2 will cause particulates fed from the bulk bag 12 to be fed gradually along the outlet chute 52. The rate of flow of the particulates through and from the outlet chute 52 is a function of the vibratory speed. Hence, the vibrators 50s1 and 50s2 may include an AC inverter controller to vary the speed of the vibrators 50s1 and 50s2. Output force varies as the square of the speed.

The unloader 10 further includes load cells 60f1, 60f2, 60r1 and 60r2 beneath the respective vertical supports 22f1, 22f2, 22r1 and 22r2. The load cells 60f1, 60f2, 60r1 and 60r2 are operative to sense the total load of the apparatus 10 and the bulk bag 12. Hence, the load cells are operative to sense the weight of particulates discharged from the unloader 10. The unloader 10 further includes a controller 62 that is connected to the load cells 60f1, 60f2, 60r1 and 60r2 and to the vibrators 50s1 and 50s2. The controller 62 receives weight data as input from the load cells 60f1, 60f2, 60r1 and 60r2 and generates control signals to the vibrators 50s1 and 50s2 for stopping, starting or changing the speed of the vibrator 50s1 and 50s2 in accordance with discharge requirements of the system. Thus, the controller 62 permits precise determination of the feed weight of the particulate materials when an appropriate weight of particulates has been dispensed. Alternatively, the controller 62 can increase or decrease the rate of discharge in accordance with system requirements.

While the invention has been described with respect to a preferred embodiment, it is apparent that various changes can be made without departing from the scope of the invention as defined by the claims. In particular, the links 48 shown herein are only one of several optional ways of supporting the hopper 40 to permit horizontal vibrational movement. For example, rubber blocks or a rubber gasket can be used to support the hopper. The outlet chute 52 is depicted as a generally cylindrical tube. However, other configurations of an outlet chute can be provided. For example, the outlet chute 52 can be a non-cylindrical tube or an open trough. The outlet chute 52 is depicted as extending in a forward direction, while the hoist support beam rejects in a rearward direction. This arrangement enables bags to be loaded efficiently into the unloader without interfering with the outlet arrangement. However, the frame 20 can be configured to permit the bag 12 to be loaded from other directions, including a side loading or a front loading.

What is claimed is:

1. A bulk bag unloader comprising:
a frame for supporting a bulk bag of particulate materials, a hopper moveably supported on the frame and disposed for receiving a discharge from the bulk bags supported on the frame, an outlet chute mounted to the hopper and having an inlet communicating with an outlet of the hopper and an outlet spaced from the inlet, the outlet chute defining an axis, two vibrator means mounted to the hopper and synchronized with one another for generating vibratory movement of the hopper and the outlet chute in directions substantially parallel to a vertical plane that includes the axis of the outlet chute and for substantially limiting vibrations in all other vertical planes.

2. The bag unloader of claim 1, wherein the axis of the outlet chute is substantially horizontal.

3. The bag unloader of claim 1, further comprising load cells for measuring loads generated by the frame, the bulk bag and particulates in the bulk bag, and for detecting a weight of particulates discharged from the bulk bag.

4. The bulk bag unloader of claim 1, wherein the vibrators are variable vibrator means for varying rates of discharge from the outlet chute.

5. The bulk bag unloader of claim 4, further comprising a controller connected to the vibrators for controlling vibratory speed and particulate discharge rates in accordance with inputs to the controller.

* * * * *